US008503860B2

(12) United States Patent  (10) Patent No.: US 8,503,860 B2
Chang et al.  (45) Date of Patent: Aug. 6, 2013

(54) METHOD OF GUIDING CURRENT REPRODUCTION POINT DURING INTEGRATED REPRODUCTION AND VIDEO DEVICE ADOPTING THE SAME

(75) Inventors: Hyo-sun Chang, Gunpo-si (KR); Hyung-jin Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1360 days.

(21) Appl. No.: 11/762,806

(22) Filed: Jun. 14, 2007

(65) Prior Publication Data

US 2008/0118219 A1 May 22, 2008

(30) Foreign Application Priority Data

Nov. 17, 2006 (KR) ........................ 10-2006-0114016

(51) Int. Cl.
*H04N 9/80* (2006.01)
(52) U.S. Cl.
USPC ............................ 386/242; 386/248; 345/530
(58) Field of Classification Search
USPC .................................................. 386/242, 248
See application file for complete search history.

(56) References Cited

U.S. PATENT DOCUMENTS

| 2002/0191950 A1* | 12/2002 | Wang ............................... 386/46 |
| 2005/0044489 A1* | 2/2005 | Yamagami et al. ............ 715/517 |
| 2006/0013556 A1 | 1/2006 | Poslinski |
| 2006/0230415 A1* | 10/2006 | Roeding ........................... 725/34 |
| 2006/0267995 A1* | 11/2006 | Radloff et al. ................. 345/530 |

FOREIGN PATENT DOCUMENTS

| CN | 1547848 A | 11/2004 |
| EP | 0 926 670 A2 | 6/1999 |
| EP | 1515552 A1 | 3/2005 |
| GB | 2 302 635 A | 1/1997 |
| WO | 2005/083977 A1 | 9/2005 |
| WO | 2006/094131 A2 | 9/2006 |

OTHER PUBLICATIONS

Summons to Attend Oral Proceedings dated Dec. 11, 2009 issued by the European Patent Office for counterpart application No. 07113233.6, English.
The First Office Action from the State Intellectual Property Office of P.R. China dated May 12, 2010, issued in counterpart Chinese Application No. 200710149054.4.

* cited by examiner

*Primary Examiner* — Thai Tran
*Assistant Examiner* — Girumsew Wendmagegn
(74) *Attorney, Agent, or Firm* — Sughrue Mion, PLLC

(57) ABSTRACT

A method of guiding a current reproduction point and a video device adopting the same are provided. The video device includes a reproduction unit; a visual information combining unit; and a control unit which controls the reproduction unit so that a second video file is reproduced after reproduction of a first video file is completed, and controls the visual information combining unit so that current reproduction point guide information for guiding a current reproduction point is displayed on the screen as the visual information. The current reproduction point guide information is information for guiding the current reproduction point, by indicating a specified mark at one point of an integrated graphic into which the first graphic for indicating the reproduction point of the first video file and the second graphic for indicating the reproduction point of the second video file are integrated.

34 Claims, 6 Drawing Sheets

METHOD OF GUIDING CURRENT REPRODUCTION POINT DURING INTEGRATED REPRODUCTION AND VIDEO DEVICE ADOPTING THE SAME

CROSS-REFERENCE TO RELATED APPLICATIONS

This application claims priority from 35 U.S.C. §119 of Korean Patent Application No. 10-2006-0114016, filed Nov. 17, 2006, in the Korean Intellectual Property Office, the entire disclosure of which is incorporated herein by reference.

BACKGROUND OF THE INVENTION

1. Field of the Invention

Devices and methods consistent with the present invention relate to a method of guiding a current reproduction point and a video device adopting the same, more particularly, to a method of guiding a current reproduction point and a video device adopting the same, which can guide the current reproduction point when video files stored in a recording medium are reproduced.

2. Description of the Related Art

In guiding the current reproduction point, it is common to use a progress bar. FIG. 1 shows guidance information on the current reproduction point using a progress bar.

As shown in FIG. 1, the current reproduction point guide information 20 displayed on a display screen 10 includes the current reproduction time 21, a progress bar 23, an indication mark 25, and the total reproduction time information 27. The indication mark 25 is positioned at a point on the progress bar 23 that corresponds to the current reproduction point to inform a user of the current reproduction point.

As shown in FIG. 1, through the current reproduction point guide information, it is possible to guide the current reproduction point of one video file only.

Even in the case of reproducing several video files in order, only the progress bar of one video file appears as the current reproduction point guide information.

SUMMARY OF THE INVENTION

Exemplary embodiments of the present invention have been developed in order to substantially solve the above and other problems associated with the related art arrangement and provide the objectives listed below. An aspect of exemplary embodiments of the present invention is to provide a method of guiding a current reproduction point and a video device adopting the same, which are suitable to a case that several video files are integratedly reproduced one by one.

According to exemplary embodiments of the present invention, there is provided a video device, which comprises a reproduction unit which reproduces video files; a visual information combining unit which combines visual information with a video signal to be displayed on a display screen to display the visual information; and a control unit which controls the reproduction unit so that the second video file is reproduced after the reproduction of the first video file is completed, and controls the visual information combining unit so that current reproduction point guide information for guiding the current reproduction point is displayed on a display screen as the visual information; wherein the current reproduction point guide information comprises information for guiding the current reproduction point, by indicating a specified mark at one point of an integrated graphic; and the integrated graphic comprises a first graphic for indicating a reproduction point of the first video file and a second graphic for indicating a reproduction point of the second video file.

The current reproduction point guide information may comprise a division mark for dividing the first and second graphics from each other.

The current reproduction point guide information may comprise the first and second graphics arranged in a straight line, and the division mark arranged between the first and second graphics.

The first and second graphics may be in the form of a bar.

A length of the division mark in one direction may differ from lengths of the first and second graphics in one direction.

A color of the division mark may differ from colors of the first and second graphics.

A pattern of the division mark may differ from patterns of the first and second graphics.

The second video file may be a video file recorded with a video signal that follows a video signal recorded in the first video file.

The current reproduction point guide information may comprise total reproduction time information that indicates by text the sum of a reproduction time of the first video file and a reproduction time of the second video file, and current reproduction time information that indicates by text the sum of the reproduction time of the first video file and the current reproduction time of the second video file while the second video file is being reproduced.

The control unit may control the reproduction unit to reproduce the second video file from a start point of the second video file after the first video file is reproduced from an end point of the first video file to a reproduction completion point of the first video file if a reproduction start command for the second video file is input after a reproduction end command for the first video file is input during the reproduction of the first video file.

The first and second video files may be video files selected by a user.

The video device according to exemplary embodiments of the present invention may further comprise a display for displaying the video recorded in the video file reproduced through the reproduction unit.

According to another aspect of exemplary embodiments of the present invention, there is provided a method of guiding a current reproduction point, which comprises controlling to reproduce a second video file after reproduction of a first video file is completed; and displaying current reproduction point guide information for guiding the current reproduction point on a display screen; wherein the current reproduction point guide information comprises information for guiding the current reproduction point, by indicating a specified mark indicate one point of an integrated graphic into which a first graphic for indicating a reproduction point of the first video file and a second graphic for indicating a reproduction point of the second video file are integrated.

The current reproduction point guide information may comprise a division mark for dividing the first and second graphics from each other.

The current reproduction point guide information may comprise the first and second graphics arranged in a straight line, and the division mark arranged between the first and second graphics.

The first and second graphics may be in the form of a bar.

A length of the division mark in one direction may differ from lengths of the first and second graphics in one direction.

A color of the division mark may differ from colors of the first and second graphics.

A pattern of the division mark may differ from patterns of the first and second graphics.

The second video file may be a video file recorded with a video signal that follows a video signal recorded in the first video file.

The current reproduction point guide information may comprise total reproduction time information that indicates by text the sum of a reproduction time of the first video file and a reproduction time of the second video file, and current reproduction time information that indicates by text the sum of the reproduction time of the first video file and the current reproduction time of the second video file while the second video file is being reproduced.

The method of guiding a current reproduction point according to exemplary embodiments of the present invention may further comprise controlling to reproduce the second video file from a start point of the second video file after the first video file is reproduced from an end point of the first video file to a reproduction completion point of the first video file if a reproduction start command for the second video file is input after a reproduction end command for the first video file is input during the reproduction of the first video file.

The first and second video files may be video files selected by a user.

According to still another aspect of exemplary embodiments of the present invention, there is provided a computer-readable recording medium provided with a program which performs controlling to reproduce a second video file after the reproduction of a first video file is completed; and displaying current reproduction point guide information for guiding the current reproduction point on a display screen; wherein the current reproduction point guide information comprises information for guiding the current reproduction point, by indicating a specified mark at one point of an integrated graphic into which a first graphic for indicating a reproduction point of the first video file and a second graphic for indicating a reproduction point of the second video file are integrated.

BRIEF DESCRIPTION OF THE DRAWINGS

The above aspects and features of embodiments of the present invention will become more apparent by describing certain exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS OF THE INVENTION

Figure 1:
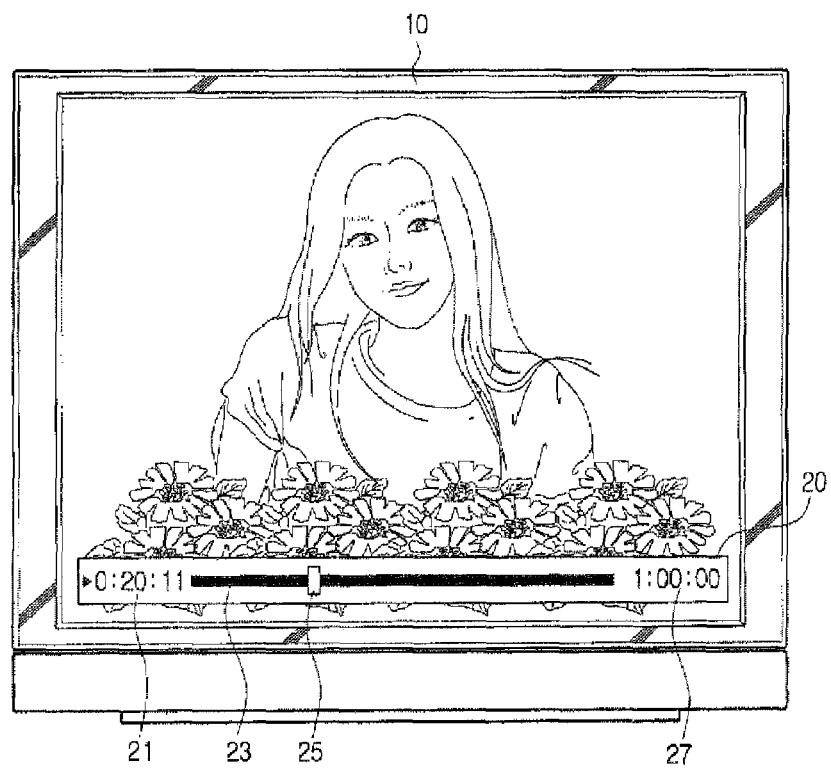
FIG. 1 is a view explaining conventional current reproduction point guide information.

Exemplary embodiments of the present invention will now be described in detail with reference to the annexed drawings. In the drawings, the same elements are denoted by the same reference numerals throughout the drawings. In the following description, detailed descriptions of known functions and configurations incorporated herein have been omitted for conciseness and clarity.

Figure 2:
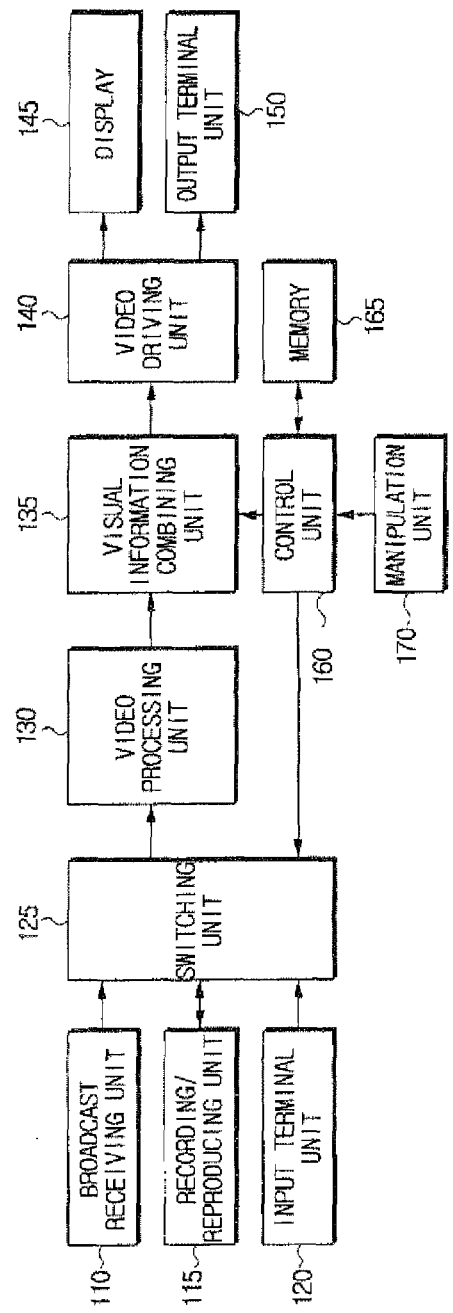
FIG. 2 is a block diagram illustrating the construction of a video device according to an exemplary embodiment of the present invention.

FIG. 2 is a block diagram illustrating the construction of a video device according to an exemplary embodiment of the present invention.

The video device according to an exemplary embodiment of the present invention is provided with an integrated reproduction function. Here, the term "integrated reproduction" relates to a sequential reproduction of several video files one by one.

Also, the video device displays current reproduction point guide information that is visual information for guiding the current reproduction point on a display screen to provide the information to a user. During an integrated reproduction, the video device displays proper current reproduction point guide information on the display screen.

As shown in FIG. 2, the video device according to an exemplary embodiment of the present invention comprises a broadcast receiving unit 110, a recording/reproducing unit, an input terminal unit 120, a switching unit 125, a video processing unit 130, a visual information combining unit 135, a video driving unit 140, a display 145, an output terminal unit 150, a control unit 160, a memory 165, and a manipulation unit 170.

The broadcast receiving unit 110 selects and demodulates a broadcast being received by wire/wireless. The recording/reproducing unit 115 stores video files in a recording medium or reproduces the video files recorded in the recording medium. The recording medium may be a magnetic recording medium such as a hard disk drive (HDD), a semiconductor recording medium such as a memory card and a flash memory, or an optical recording medium such as a digital versatile disk (DVD).

The input terminal unit 120 receives a video signal from an external device (e.g., a set-top box) connected thereto.

The switching unit 125 performs a switching operation so as to transfer one of video signals output from the broadcast receiving unit 110, the recording/reproducing unit 115, and the input terminal unit 120 to the video processing unit 130. The operation of the switching unit 125 is controlled by the control unit 160 to be described later.

The video processing unit 130 processes the video signal transferred through the switching unit 125.

The visual information combining unit 135 combines visual information in the form of characters, symbols, and/or graphics with the video signal output from the video processing unit 130. Through the visual information combining unit 135, the visual information is displayed on the display screen. In this case, the visual information combining unit 135 combines the visual information with the video signal to be displayed by on-screen display (OSD).

The video driving unit 140 displays the video signal combined with the visual information, which is output from the visual information combining unit 135, on the display 145, and/or transmits the video signal to the external device connected thereto through the output terminal unit 150.

The control unit 160 controls the operation of the video device in accordance with a user's manipulation command input through the manipulation unit 170, using the program and data stored in the memory 165.

Specifically, the control unit 160, during an integrated reproduction, controls the recording/reproducing unit 115 to integratedly reproduce several video files one by one, and controls the visual information combining unit 135 to display the current reproduction point guide information suitable to the integrated reproduction on the screen.

Hereinafter, the method of guiding the current reproduction point during the integrated reproduction will be described in detail with reference to FIG. 3, which is a flowchart illustrating a method of guiding a current reproduction point during an integrated reproduction according to an exemplary embodiment of the present invention.

Figure 3:
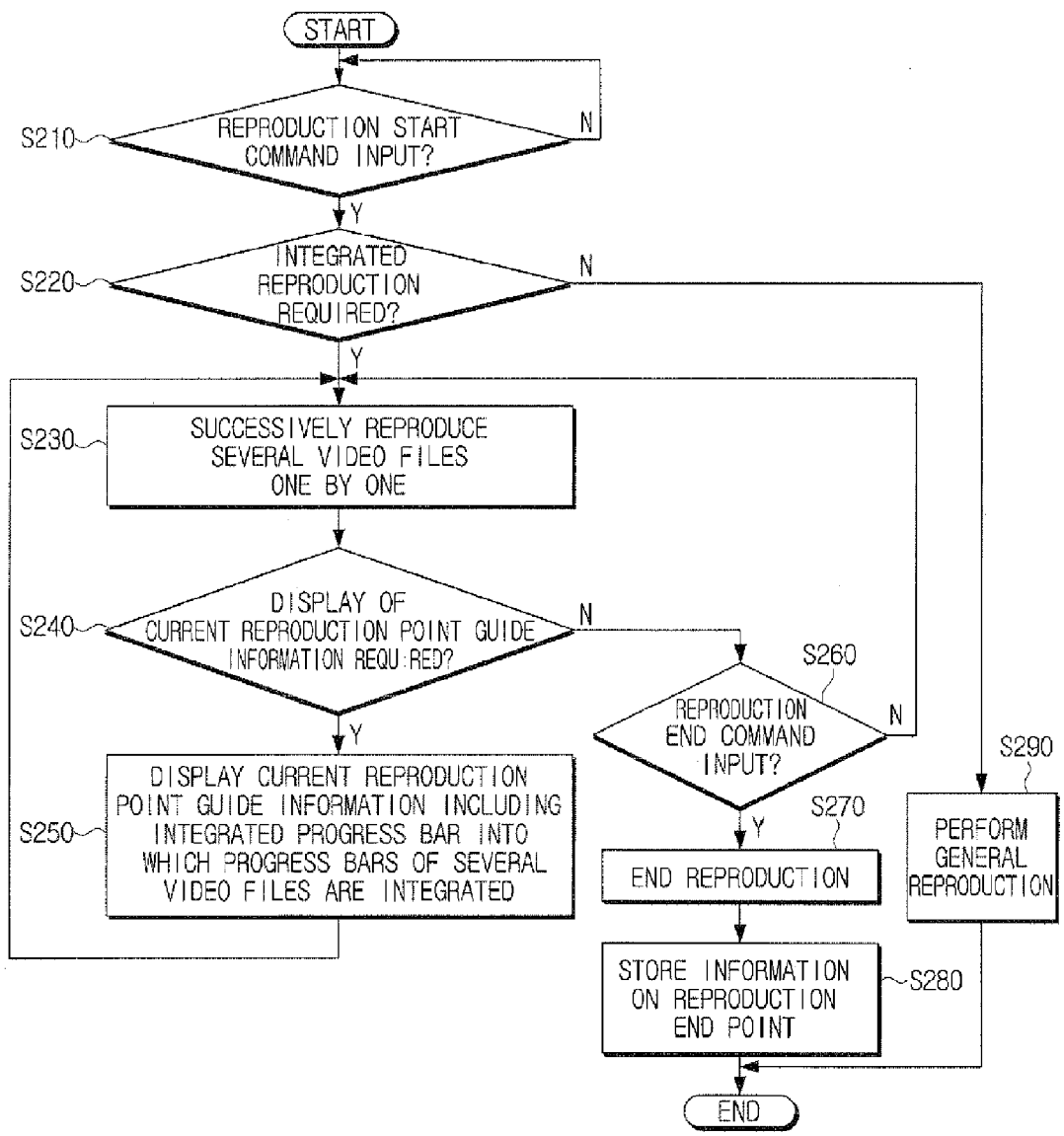
FIG. 3 is a flowchart illustrating a method of guiding a current reproduction point during an integrated reproduction according to an exemplary embodiment of the present invention.

As shown in FIG. 3, if a reproduction start command is input from a user ("Y" at operation (S210)), the control unit 160 judges whether an integrated reproduction is required at operation (S220). As described above, the integrated reproduction relates to the sequential reproduction of several video files one by one.

The integrated reproduction is required in two cases. One is a case that the user selects several video files, and inputs a command to successively reproduce the selected video files one by one.

The other is a case that other video files, which are related to the video file for which the user inputs a reproduction start command, exist in the recording medium. For example, in this case, other video files recorded with other videos that constitute a series of videos including the video recorded in the video file of which the reproduction start is commanded.

More specifically, for example, if the reproduction start command is input for the first video file recorded with the first part of drama "A", and the second video file recorded with the second part of drama "A" and the third video file recorded with the third part of drama "A" further exist in the recording medium, it is required to perform the integrated reproduction for successively reproducing the first to third video files one by one.

That is, video files, which are recorded with videos arranged before or after the video recorded in the video file of which the reproduction start is commanded, may be related to the video file of which the reproduction start is commanded, and thus may be targets of integrated reproduction together with the video file of which the reproduction start is commanded.

If it is judged that the integrated reproduction is required ("Y" at operation (S220)), the control unit 160 controls the recording/reproducing unit 115 to integratedly reproduce several video files one by one at operation (S230). For example, the control unit 160 controls the recording/reproducing unit 115 to reproduce a second video file after the reproduction of a first video file is completed, and then reproduce a third file after the reproduction of the second video file is completed.

Then, the control unit 160 judges whether the display of the current reproduction point guide information is required at operation (S240). The case that the display of the current reproduction point guide information is required may be 1) a case that the user has commanded the display of the current reproduction point guide information, or 2) a case that the user has commanded the change of the current reproduction point (e.g., a case that the user has commanded a "fast forward" or "rewind" operation).

If it is judged that the display of the current reproduction point guide information is required ("Y" at operation (S240)), the control unit 160 controls the visual information combining unit 135 to display the current reproduction point guide information on the screen at operation (S250). In this case, the current reproduction point guide information displayed on the screen includes an integrated progress bar and an indication mark that guides the current reproduction point by indicating one point of the integrated progress bar.

Unlike the general progress bar which represents one video file, the integrated progress bar combines progress bars of several video files to be integratedly reproduced.

Figure 4A:
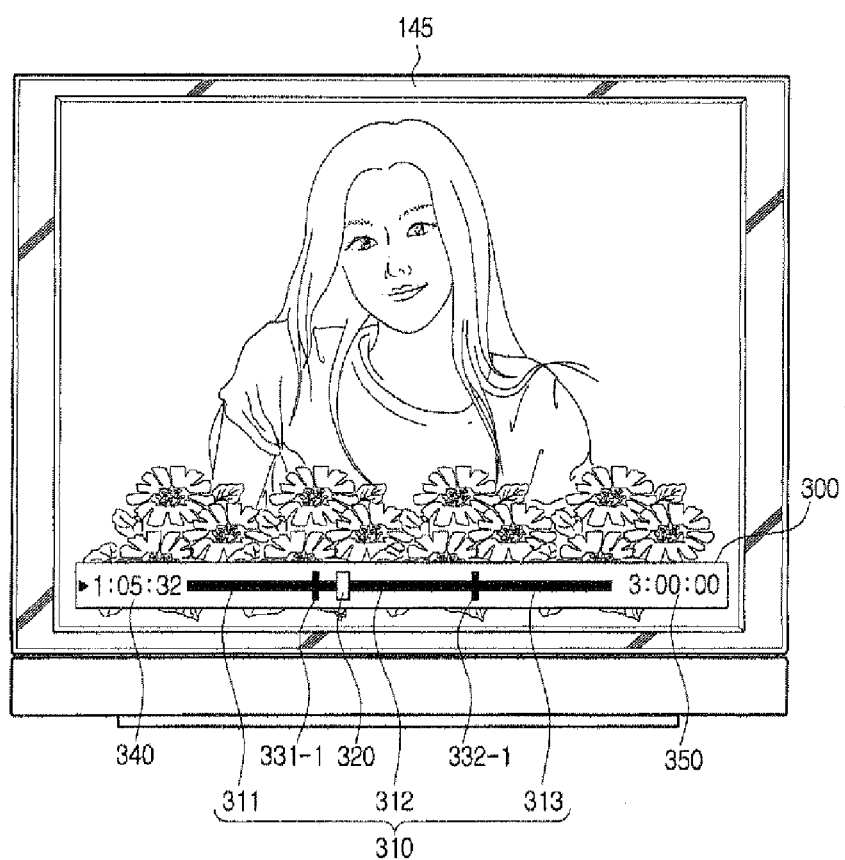
FIG. 4A is a view illustrating an example of the current reproduction point guide information displayed at operation (S250) in FIG. 3.

FIG. 4A shows an example of the current reproduction point guide information that can be displayed at operation (S250). It is exemplified that the current reproduction point guide information indicates three video files (i.e., the first to third video files) to be integratedly reproduced.

As described above, the current reproduction point guide information 300 displayed on the display 145 includes the integrated progress bar 310 and the indication mark 320. The integrated progress bar 310 includes a progress bar 311 for the first video file, a progress bar 312 for the second video file, and a progress bar 313 for the third video file. Specifically, the progress bars 311, 312, and 313 included in the integrated progress bar 310 are arranged in a straight line.

On the other hand, among the progress bars 311, 312, and 313, division marks 331-1 and 332-1 are provided. These division marks 331-1 and 332-1 are marks for dividing the progress bars 311, 312, and 313 in the straight line.

As shown in FIG. 4A, since the vertical length of the division marks 331-1 and 332-1 is longer than that of the progress bars 311, 312, and 313, the division marks 331-1 and 332-1 can divide the progress bars 311, 312, and 313 in the straight line.

Figure 4B:
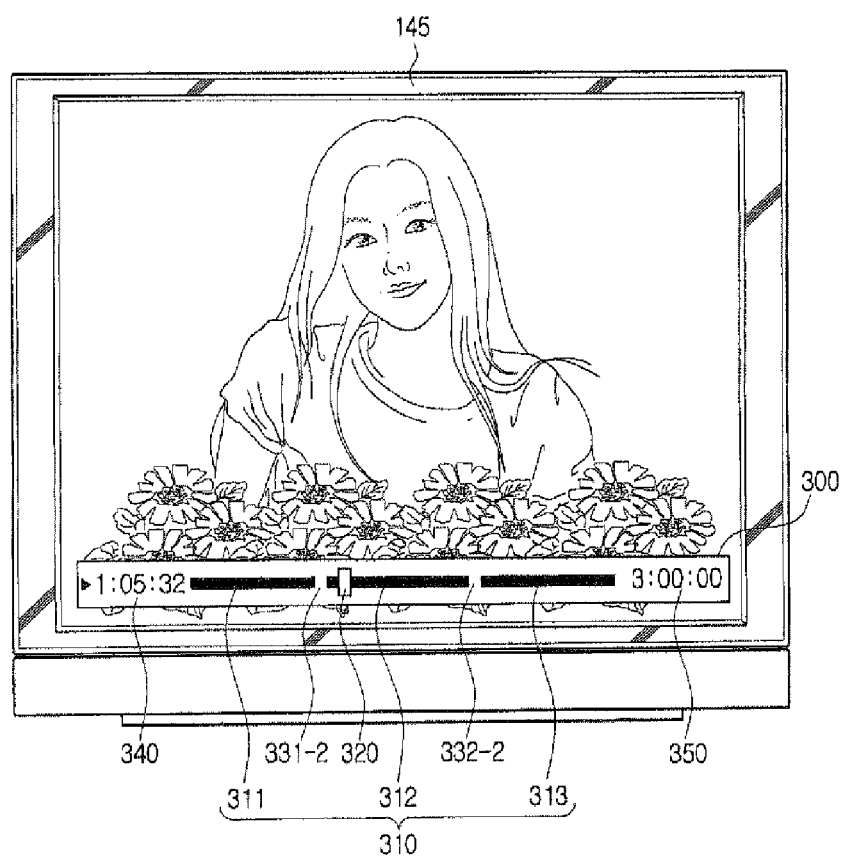
FIG. 4B is a view illustrating another example of the current reproduction point guide information displayed at operation (S250) in FIG. 3.

In addition to the case of implementing the division marks 331-1 and 332-1 so that the length of the division marks 331-1 and 332-1 in one direction is different from that of the progress bars 311, 312, and 313 in the same direction, the division marks 331-1 and 332-1 may be implemented 1) so that their color is different from that of the progress bars 311, 312, and 313, or 2) so that their pattern is different from that of the progress bars 311, 312, and 313, to divide the progress bars 311, 312, and 313 in the straight line. FIG. 4B shows the current reproduction point guide information 300 in which the color of the division marks 331-1 and 332-1 is different from that of the progress bars 311, 312, and 313.

Also, the current reproduction point guide information 300 includes the current reproduction time information 340 and the total reproduction time information 350.

The total reproduction time information 350 is information that indicates by text the sum of the reproduction times of the video files to be integratedly reproduced. As shown in FIG. 4A, it is exemplified that each reproduction time of the first to third video files is one hour, and thus the total reproduction time becomes three hours.

The current reproduction time information 340 is information that indicates time corresponding to the point of the integrated progress bar indicated by the indication mark 320. In other words, the current reproduction time information 340 is information that indicates by text the sum of the reproduction time of the already reproduced video file and the reproduction time of the currently reproduced video file.

The current reproduction point guide information as displayed at operation (S250) has been described in detail. As described above, although it is exemplified that the current reproduction point guide information 300 is provided with the bar-shaped progress bars as graphics capable of indicating the reproduction point of the video file, it may also be implemented using graphics having different shapes.

In this case, the integrated progress bar, in which the progress bars for the video files to be integratedly reproduced are integrated, can be implemented using the graphics having the shapes different from the bar-shaped integrated progress bar.

If a reproduction end command is input from the user ("Y" at operation (S260), the control unit 160 controls the recording/reproducing unit 115 to end the reproduction at operation (S270), and stores information on the reproduction end point in the memory 165 at operation (S280). This is for the re-start of the reproduction from the reproduction end point when the integrated reproduction is resumed later.

More specifically, it is assumed that the first to third video files are successive video files and the reproduction end point is an intermediate point of the second video file. If the reproduction start command for the third video file is input from the user in this case, the control unit 160 controls the recording/reproducing unit 115 to perform the reproduction from the intermediate point of the second video file that is the reproduction end point, not from the start point of the third video file. This is for providing convenience to the user who does not remember the video file and the reproduction end point of the video file which has been reproduced.

On the other hand, if it is judged that the integrated reproduction is not required at operation ("N" at operation (220)), the control unit 160 controls the recording/reproducing unit 115 and the visual information combining unit 135 to perform a general reproduction at operation (S290). Accordingly, only one video file is reproduced, and the progress bar for one video file is displayed as the current reproduction point guide information that is provided as needed.

Till now, the method of guiding the current reproduction point during the integrated reproduction and the video device adopting the method according to an exemplary embodiment of the present invention has been described in detail. It is not required for the video device according to the present invention to be provided with all the blocks as illustrated in FIG. 2, and unnecessary blocks may be omitted. For example, in the case where the video device is the set-top box, the display 145 may be omitted.

Hereinafter, the video device and the method of guiding the current reproduction point according to another exemplary embodiment of the present invention will be explained with reference to FIGS. 5 and 6.

Figure 5:
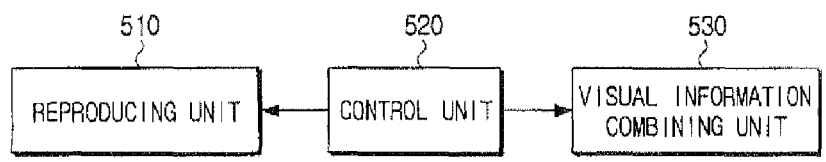
FIG. 5 is a block diagram illustrating the construction of a video device according to another exemplary embodiment of the present invention.

FIG. 5 is a block diagram illustrating the construction of a video device according to another exemplary embodiment of the present invention.

As shown in FIG. 5, the video device according to another exemplary embodiment of the present invention comprises a reproduction unit 510, a control unit 520, and a visual information combining unit 530.

The reproduction unit 510 reproduces video files, and the visual information combining unit 530 combines visual information with the video signal to be displayed on the screen.

The control unit 520 controls the reproduction unit 510 to reproduce the second video file after the reproduction of the first video file is completed. Then, the control unit 520 controls the visual information combining unit 530 to display the current reproduction point guide information for guiding the current reproduction point on the display screen as the visual information.

The current reproduction point guide information is information that guides the current reproduction point, by indicating a specified mark at a point of the integrated graphic into which the first graphic for indicating the reproduction point of the first video file and the second graphic for indicating the reproduction point of the second video file are integrated.

Figure 6:
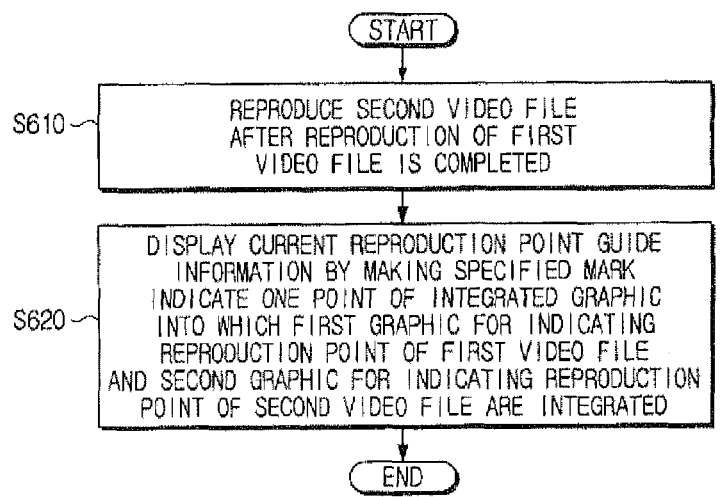
FIG. 6 is a flowchart illustrating a method of guiding a current reproduction point during an integrated reproduction according to another exemplary embodiment of the present invention.

According to the method of guiding a current reproduction point during an integrated reproduction according to another exemplary embodiment of the present invention, as shown in FIG. 6, the control unit 520 controls the reproduction unit 510 to reproduce the second video file after the reproduction of the first video file is completed at operation (S610).

Then, the control unit 520 controls the visual information combining unit 530 to display the current reproduction point guide information for guiding the current reproduction point on the display screen as the visual information at operation (S620). The current reproduction point guide information is information that guides the current reproduction point, by indicating a specified mark at a point of the integrated graphic into which the first graphic for indicating the reproduction point of the first video file and the second graphic for indicating the reproduction point of the second video file are integrated.

Till now, the method of guiding the current reproduction point and the video device adopting the method according to another exemplary embodiment of the present invention has been described in detail with reference to FIGS. 5 and 6. In the exemplary embodiment of the present invention, it is exemplified that two video files (the first video file and the second video file) are integratedly reproduced. However, it will be apparent that even to a case that three or more video files are integratedly reproduced, the feature of the present invention can be applied as it is. Since the above-described case can be easily derived from the description of the exemplary embodiments of the present invention as above, detailed description thereof will be omitted.

On the other hand, since the method of guiding the current reproduction point during the integrated reproduction as described above can be implemented by a computer program, and can be easily implemented by those skilled in the art on the basis of the above description, detailed explanation thereof will be omitted.

As described above, according to the exemplary embodiments of the present invention, proper current reproduction point guide information can be provided in the case of the integrated reproduction for successively reproducing several video files one by one, and thus the user can seize the current reproduction point at a look from a standpoint of the integrated reproduction.

In addition, not only in the case where the user has commanded the integrated reproduction but also in the case where the integrated reproduction is suitable, the integrated reproduction can be automatically performed, and thus convenience can be offered to the user.

The foregoing embodiments and aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A video device comprising:
   a reproduction unit which reproduces video files;
   a visual information combining unit which combines visual information with a video signal to be displayed on a display screen to display the visual information; and
   a control unit which controls the reproduction unit so that a second video file is reproduced after a reproduction of a first video file is completed, the second video file being a separate video file from the first video file, and controls the visual information combining unit so that current reproduction point guide information for guiding a current reproduction point is displayed on a display screen as the visual information;

wherein the current reproduction point guide information comprises information for guiding the current reproduction point, by indicating a specified mark at one point of an integrated graphic; and the integrated graphic comprises a first graphic for indicating a reproduction point of the first video file and a second graphic for indicating a reproduction point of the second video file, wherein, if an additional video file related to the first video file or the second video file exists, the control unit automatically controls the reproduction unit so that the additional video file is reproduced after a reproduction of the first video file or the second video file, wherein, when a reproduction start command for the second video file is input by a user, if a reproduction end command for the first video file has been previously input at an intermediate point of the first video file, the control unit automatically controls the reproduction unit to reproduce the first video file from the intermediate point of the first video file, and subsequently reproduces the second video file from a start point of the second video file.

2. The video device of claim 1, wherein the current reproduction point guide information comprises a division mark for dividing the first and second graphics from each other.

3. The video device of claim 2, wherein the current reproduction point guide information comprises the first and second graphics arranged in a straight line, and the division mark arranged between the first and second graphics.

4. The video device of claim 3, wherein the first and second graphics are in a form of a bar.

5. The video device of claim 2, wherein a length of the division mark in one direction differs from lengths of the first and second graphics in one direction.

6. The video device of claim 2, wherein a color of the division mark differs from colors of the first and second graphics.

7. The video device of claim 2, wherein a pattern of the division mark differs from patterns of the first and second graphics.

8. The video device of claim 1, wherein the second video file is a video file recorded with a video signal that follows a video signal recorded in the first video file.

9. The video device of claim 8, wherein the current reproduction point guide information comprises total reproduction time information that indicates by text a sum of a reproduction time of the first video file and a reproduction time of the second video file, and current reproduction time information that indicates by text a sum of the reproduction time of the first video file and the current reproduction time of the second video file while the second video file is being reproduced.

10. The video device of claim 1, wherein the first and second video files are video files selected by a user.

11. The video device of claim 1, further comprising a display which displays the video recorded in the video file reproduced through the reproduction unit.

12. A method of guiding a current reproduction point, comprising:

controlling a reproduction of a first video file and a second video file, the second video file being a separate video file from the first video file; and displaying current reproduction point guide information for guiding the current reproduction point on a display screen;

wherein the current reproduction point guide information includes information for guiding the current reproduction point, by indicating a specified mark at one point of an integrated graphic into which a first graphic for indicating a reproduction point of the first video file and a second graphic for indicating a reproduction point of the second video file, are integrated, automatically reproducing an additional video file, if an additional video file, which is related to the first video file or the second video file, exists, wherein, when a reproduction start command for the second video file is input by a user, if a reproduction end command for the first video file has been previously input at an intermediate point of the first video file, automatically reproducing the first video file from the intermediate point of the first video file, and subsequently reproducing the second video file from a start point of the second video file.

13. The method of claim 12, wherein the current reproduction point guide information comprises a division mark for dividing the first and second graphics from each other.

14. The method of claim 13, wherein the current reproduction point guide information comprises the first and second graphics arranged in a straight line, and the division mark arranged between the first and second graphics.

15. The method of claim 14, wherein the first and second graphics are in a form of a bar.

16. The method of claim 13, wherein a length of the division mark in one direction differs from lengths of the first and second graphics in one direction.

17. The method of claim 13, wherein a color of the division mark differs from colors of the first and second graphics.

18. The method of claim 13, wherein a pattern of the division mark differs from patterns of the first and second graphics.

19. The method of claim 12, wherein the second video file is a video file recorded with a video signal that follows a video signal recorded in the first video file.

20. The method of claim 19, wherein the current reproduction point guide information comprises total reproduction time information that indicates by text a sum of a reproduction time of the first video file and a reproduction time of the second video file, and current reproduction time information that indicates by text a sum of the reproduction time of the first video file and the current reproduction time of the second video file while the second video file is being reproduced.

21. The method of claim 12, wherein the first and second video files are video files selected by a user.

22. A computer-readable non-transitory recording medium provided with a program which comprises:

controlling a reproduction of a first video file and a second video file, the second video file being a separate video file from the first video file; and displaying current reproduction point guide information for guiding the current reproduction point on a display screen;

wherein current reproduction point guide information is information for guiding the current reproduction point, by indicating a specified mark at one point of an integrated graphic into which a first graphic for indicating a reproduction point of the first video file and a second graphic for indicating a reproduction point of the second video file are integrated, automatically reproducing an additional video file, if an additional video file, which is related to the first video file or the second video file, exists, wherein, when a reproduction start command for the second video file is input by a user, if a reproduction end command for the first video file has been previously input at an intermediate point of the first video file, automatically reproducing the first video file from the intermediate point of the first video file, and subsequently reproducing the second video file from a start point of the second video file.

23. A video device comprising:
a reproduction unit which reproduces video files;
a visual information combining unit which combines visual information with a video signal to be displayed on a display screen to display the visual information; and
a control unit which controls the reproduction unit so that a second video file is reproduced after a reproduction of a first video file is completed, the second video file being a separate video file from the first video file, and controls the visual information combining unit so that current reproduction point guide information for guiding a current reproduction point is displayed on a display screen as the visual information;
wherein the current reproduction point guide information comprises information for guiding the current reproduction point, by indicating a specified mark at one point of an integrated graphic;
the integrated graphic comprises a first graphic for indicating a reproduction point of the first video file and a second graphic for indicating a reproduction point of the second video file; and
wherein the current reproduction point guide information comprises a division mark for dividing the first and second graphics from each other,
wherein, when a reproduction start command for the second video file is input by a user, if a reproduction end command for the first video file has been previously input at an intermediate point of the first video file, the control unit automatically controls the reproduction unit to reproduce the first video file from the intermediate point of the first video file, and subsequently reproduces the second video file from a start point of the second video file.

24. The video device of claim 23, wherein the current reproduction point guide information comprises the first and second graphics arranged in a straight line, and the division mark arranged between the first and second graphics.

25. The video device of claim 24, wherein the first and second graphics are in a form of a bar.

26. The video device of claim 23, wherein a length of the division mark in one direction differs from lengths of the first and second graphics in one direction.

27. The video device of claim 23, wherein a color of the division mark differs from colors of the first and second graphics.

28. The video device of claim 23, wherein a pattern of the division mark differs from patterns of the first and second graphics.

29. A method of guiding a current reproduction point, comprising:
controlling a reproduction of a first video file and a second video file, the second video file being a separate video file from the first video file; and
displaying current reproduction point guide information for guiding the current reproduction point on a display screen;
wherein the current reproduction point guide information includes information for guiding the current reproduction point, by indicating a specified mark at one point of an integrated graphic into which a first graphic for indicating a reproduction point of the first video file and a second graphic for indicating a reproduction point of the second video file, are integrated, and
wherein the current reproduction point guide information comprises a division mark for dividing the first and second graphics from each other,
wherein, when a reproduction start command for the second video file is input by a user, if a reproduction end command for the first video file has been previously input at an intermediate point of the first video file, automatically reproducing the first video file from the intermediate point of the first video file, and subsequently reproducing the second video file from a start point of the second video file.

30. The method of claim 29, wherein the current reproduction point guide information comprises the first and second graphics arranged in a straight line, and the division mark arranged between the first and second graphics.

31. The method of claim 30, wherein the first and second graphics are in a form of a bar.

32. The method of claim 29, wherein a length of the division mark in one direction differs from lengths of the first and second graphics in one direction.

33. The method of claim 29, wherein a color of the division mark differs from colors of the first and second graphics.

34. The method of claim 29, wherein a pattern of the division mark differs from patterns of the first and second graphics.

* * * * *